United States Patent
Shor et al.

(10) Patent No.: US 10,178,641 B2
(45) Date of Patent: Jan. 8, 2019

(54) SYSTEM AND METHOD FOR AUTOMATIC DELAY COMPENSATION IN A RADIO BASE STATION SYSTEM

(71) Applicant: FREESCALE SEMICONDUCTOR, INC., Austin, TX (US)

(72) Inventors: Roi Menahem Shor, Tel-Aviv (IL); Avraham Horn, Givat Shmuel (IL); Yael Rozin, Rannnana (IL)

(73) Assignee: NXP USA, Inc., Austin, TX (US)

( * ) Notice: Subject to any disclaimer, the term of this patent is extended or adjusted under 35 U.S.C. 154(b) by 84 days.

(21) Appl. No.: 14/987,072

(22) Filed: Jan. 4, 2016

(65) Prior Publication Data

US 2017/0195981 A1 Jul. 6, 2017

(51) Int. Cl.
*H04W 56/00* (2009.01)
*H04W 88/08* (2009.01)

(52) U.S. Cl.
CPC ..... *H04W 56/009* (2013.01); *H04W 56/0015* (2013.01); *H04W 88/08* (2013.01)

(58) Field of Classification Search
CPC ........... H04W 56/009; H04W 56/0015; H04W 88/08
See application file for complete search history.

(56) References Cited

U.S. PATENT DOCUMENTS

| | | |
|---|---|---|
| 6,212,169 B1 | 4/2001 | Bawa et al. |
| 7,099,969 B2 | 8/2006 | McAfee et al. |
| 7,391,317 B2 | 6/2008 | Abraham et al. |
| 7,924,054 B1 | 4/2011 | Doubler et al. |
| 7,940,667 B1 | 5/2011 | Coady et al. |
| 8,171,121 B2 | 5/2012 | Ayyar et al. |
| 8,295,294 B2 | 10/2012 | Kerr et al. |
| 8,443,126 B2 | 5/2013 | Elboim |

(Continued)

FOREIGN PATENT DOCUMENTS

| | | |
|---|---|---|
| CN | 101082894 A | 12/2007 |
| EP | 2772109 A1 | 9/2014 |
| WO | WO 2017/077361 A1 * | 5/2017 |

OTHER PUBLICATIONS

Common Public Radio Interface (CPRI); Interface Specification V6.0 (Aug. 30, 2013).*

(Continued)

*Primary Examiner* — Shailendra Kumar

(57) ABSTRACT

A method including performing a delay measurement of a first round trip delay value of an interface link, the first round trip delay value based on a transmission of a first REC synchronization signal to a RE and when a REC receives a first RE synchronization signal back, wherein frames transmitted by the REC are synchronized based upon the first REC synchronization signal, and frames transmitted by the RE are synchronized based upon the first RE synchronization signal. Calculating a first delay change value between the first round trip delay value and a previous round trip delay value, in response to determining that the first delay change value violates a delay tolerance value, transmitting an offset indicator that indicates an amount of offset the RE is to shift the first RE synchronization signal at a future time, and transmitting frames from the REC after shifting the first REC synchronization signal.

20 Claims, 5 Drawing Sheets

(56) References Cited

U.S. PATENT DOCUMENTS

| | | | | |
|---|---|---|---|---|
| 8,599,827 | B2* | 12/2013 | Irvine | H04J 3/0632 370/350 |
| 8,660,013 | B2* | 2/2014 | Yonge, III | H04L 12/413 370/241 |
| 8,676,273 | B1 | 3/2014 | Fujisaki | |
| 9,036,544 | B2 | 5/2015 | Johansson et al. | |
| 9,282,476 | B2 | 3/2016 | Fujita | |
| 2004/0218565 | A1 | 11/2004 | Davis | |
| 2005/0105534 | A1 | 5/2005 | Osterling | |
| 2005/0259616 | A1 | 11/2005 | Major et al. | |
| 2008/0171569 | A1 | 7/2008 | Pralle et al. | |
| 2008/0225816 | A1* | 9/2008 | Osterling | H04J 3/0682 370/342 |
| 2009/0245228 | A1 | 10/2009 | Osterling | |
| 2010/0291955 | A1 | 11/2010 | Sattele | |
| 2011/0032910 | A1* | 2/2011 | Aarflot | H04J 3/0682 370/335 |
| 2012/0057572 | A1 | 3/2012 | Evans et al. | |
| 2012/0250520 | A1* | 10/2012 | Chen | H04L 5/001 370/241 |
| 2014/0289781 | A1 | 9/2014 | Frydman et al. | |
| 2016/0037580 | A1 | 2/2016 | Shor et al. | |
| 2017/0064661 | A1* | 3/2017 | Katagiri | H04W 56/0045 |
| 2017/0070440 | A1 | 3/2017 | Hardt et al. | |

OTHER PUBLICATIONS

U.S. Appl. No. 14/969,581, Inventor Roi Menahem Shor, "System and Method for Automatic Load Adaptive Antenna Carrier Bandwidth Dynamic Reconfiguration in Radio Base Station System", filed Dec. 15, 2015, Office Action—Ex parte Quayle, dated Jul. 14, 2017.

U.S. Appl. No. 14/824,684, filed Aug. 12, 2015, entitled "System and Method for Radio Base Tation Device Hot Switching and Hot Swapping".

U.S. Appl. No. 14/824,768, filed Aug. 12, 2015, entitled "System and Method for Radio Base Station Device Hot Reconnection (Hot Plugging)".

U.S. Appl. No. 14/969,879, filed Dec. 15, 2015, entitled"System and Method for on-the-Fly Modification of the Properties on an Active Antenna Carrier in Radio Base Station Communication Operation".

U.S. Appl. No. 14/824,684, Inventor Roi Menahem Shor, "System and Method for Radio Base Station Device Hot Switching and How Swapping", filed Aug. 12, 2015, Office Action—Non Final Rejection, dated Dec. 14, 2017.

U.S. Appl. No. 14/969,581, Inventor Roi Menahem Shor, "System and Method for Automatic Load Adaptive Antenna Carrier Bandwidth Dynamic Reconfiguration in Radio Base Station System", filed Dec. 15, 2015, Office Action—Notice of Allowance, dated Sep. 6, 2017.

Non-Final Office Action dated Feb. 22, 2018 for U.S. Appl. No. 14/969,879, 23 pages.

Non-Final Office Action dated Mar. 8, 2018 for U.S. Appl. No. 14/824,768, 32 pages.

Notice of Allowance dated Dec. 21, 2017 for U.S. Appl. No. 14/969,581, 8 pages.

Notice of Allowance dated Mar. 27, 2018 for U.S. Appl. No. 14/969,581, 20 pages.

U.S. Appl. No. 14/969,581, filed Dec. 15, 2015, entitled "System and Method for Automatic Load Adaptive Antenna Carrier Bandwidth Dynamic Reconfiguration in Radio Base Station System".

Notice of Allowance, dated Jul. 18, 2018, U.S. Appl. No. 14/969,879 20 pages.

Notice of Allowance, dated Aug. 7, 2018, U.S. Appl. No. 14/824,684 30 pages.

* cited by examiner

SYSTEM AND METHOD FOR AUTOMATIC DELAY COMPENSATION IN A RADIO BASE STATION SYSTEM

CROSS REFERENCE TO RELATED APPLICATION(S)

The present application is related to co-pending U.S. patent application Ser. No. 14/969,581, entitled "SYSTEM AND METHOD FOR AUTOMATIC LOAD ADAPTIVE ANTENNA CARRIER BANDWIDTH DYNAMIC RECONFIGURATION IN RADIO BASE STATION SYSTEM," filed on Dec. 15, 2015. The present application is related to co-pending U.S. patent application Ser. No. 14/969,879, entitled "SYSTEM AND METHOD FOR ON-THE-FLY MODIFICATION OF THE PROPERTIES ON AN ACTIVE ANTENNA CARRIER IN RADIO BASE STATION COMMUNICATION OPERATION," filed on Dec. 15, 2015. The present application is related to co-pending U.S. patent application Ser. No. 14/824,768, entitled "SYSTEM AND METHOD FOR RADIO BASE STATION DEVICE HOT RECONNECTION (HOT PLUGGING)," filed on Aug. 12, 2015. The present application is related to co-pending U.S. patent application Ser. No. 14/824,684, entitled "SYSTEM AND METHOD FOR RADIO BASE STATION DEVICE HOT SWITCHING AND HOT SWAPPING," filed on Aug. 12, 2015.

FIELD OF THE DISCLOSURE

This disclosure generally relates to radio based communications, and more particularly to a radio base station system.

BACKGROUND

Radio base station systems (RBSs) operate to provide communication for one or more wireless user equipment units over one or more radio access networks of a cellular communication system. A radio access network is used by service providers to establish one or more point-to-point communication paths, e.g., such as a communication between two smart phones, a smart phone and a data server, and the like. An RBS has one or more radio equipment control (REC) devices, one or more radio equipment (RE) devices connected to one or more antennas that are used to facilitate the point-to-point communication paths defined by the service providers. The REC devices operate to communicate with the radio access networks via a network interface and the RE devices operate in conjunction with the antennas to communicate with the wireless user equipment units, such as smart phones, via an air interface which transmits and receives signals over the one or more antennas. The REC and RE devices operate with each other via the one or more interface links. The point-to-point information that is transmitted is streaming information based upon a particular streaming protocol, wherein a streaming protocol is a continuous stream of information that cannot be put on hold and has no re-transmission capabilities and, as such the interface links need to be operational for all communication to keep data from being dropped.

A typical RBS has a REC connected to a RE via an interface link having properties that are defined during a negotiation process. The properties are based upon a delay measurement of a round trip delay value, which is the time period measured between the point of time when the REC transmits a synchronization transmission of data to the RE and the point of time when the REC receives the synchronization transmission back from the RE. The round trip delay value can be greatly influenced by the physical length and temperature of the link, where the temperature of the link can vary over time and cause the round trip delay value to change. During operation of the RBS, the round trip delay value can change enough, such that, a reconfiguration of the link is required to properly compensate for this change. The communication of streaming information over the link must be stopped in order to reconfigure the relevant properties of the link and the communication can only be restarted after the reconfiguration process has completed and at a specific communication data synchronization point. Such result in meaningful down time resulting in the loss of streaming data, and impacting the quality of service of the RBS.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An embodiment of a radio base station system (RBS) is disclosed that includes a radio equipment control (REC) device having a delay compensation module, a radio equipment (RE) device having a delay compensation module, one or more antennas, and an interface link connected to the REC and the RE. During an initial configuration process of the interface link, a handshake process, referred to as an auto-negotiation, occurs between the REC and the RE to establish a link configuration based upon service provider requirements that is utilized by the REC and the RE to transmit frames containing streaming data over the interface link. The delay compensation module of the REC also performs an initial delay measurement of a round trip delay value of the interface link, which is the time period measured between the point when the REC transmits a synchronization transmission of data to the RE and until the REC receives the synchronization transmission back from the RE, to implement an initial delay compensation of the link. During operation the RBS receives streaming data information that will be transmitted at consecutive data frame instances over the interface link based on the link configuration and the initial delay compensation of the interface link.

The REC periodically performs a new delay measurement of the round trip delay value to determine whether the delay change between the new delay measurement and the initial delay measurement is within a pre-defined margin. When the REC determines that the delay change has violated the pre-defined margin as defined by a delay tolerance, the REC can decide that the interface link is to change to operate based on a new delay compensation. The new delay compensation can compensate for the changed round trip delay value and cause the changed round trip delay value to return within the delay tolerance. New delay compensation information relating to the new delay compensation is provided to the RE from the REC in advance of the change so that the RE can prepare to receive frames based on the new delay compensation. As such, the RE and REC continue to communicate frames based on the initial delay compensation while preparing for the new delay compensation. Timing information is also provided to the RE by the REC that indicates when the change is to occur. In this manner, the REC compensates for delay changes of the interface link between the REC and the RE without downtime, which is associated with the typical auto-negotiation process that establishes the initial interface link. Thus, streaming data is not lost. Various embodiments of the present disclosure will be better understood with reference to the attached Figures.

Figure 1:
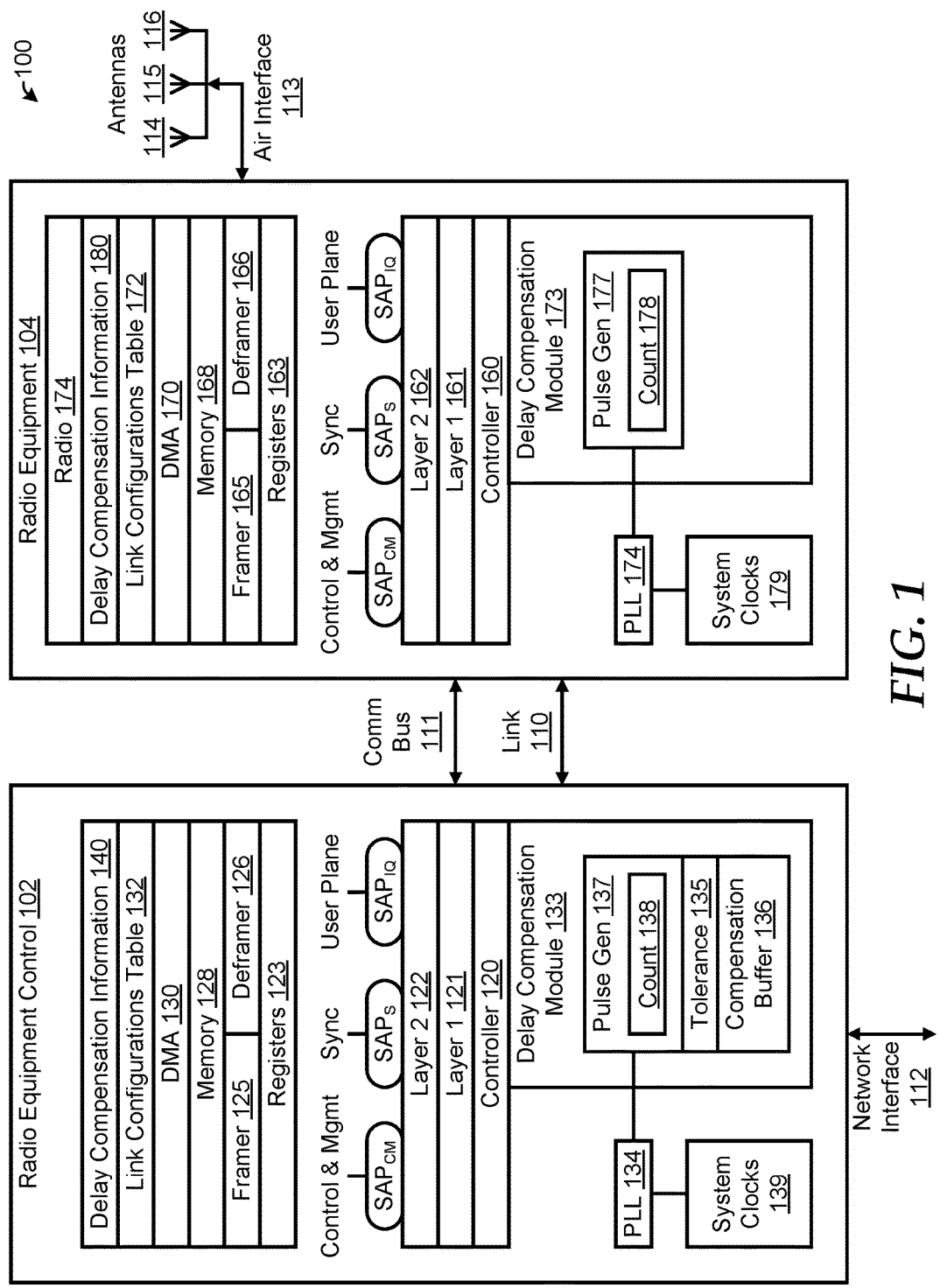
FIG. 1 is a block diagram illustrating a radio base station system including a radio equipment control device having a controller that performs automatic delay compensation of an interface link in operation, in accordance with at least one embodiment of the present disclosure.

FIG. 1 illustrates a radio base station system (RBS) 100 that performs automatic delay compensation of an interface link in operation. RBS 100 includes a radio equipment control (REC) device 102 and a radio equipment (RE) device 104. REC 102 provides the radio functions of the digital baseband domain including the radio access network interface transport, transmit/receive of information between REC 102 and RE 104, the radio base station control and management, and the digital baseband processing. RE 104 provides the analogue and radio frequency functions including filtering, modulation, frequency conversion, and amplification. In an embodiment, RBS 100 includes a chain of REC devices coupled to a chain of RE devices.

REC 102 communicates with one or more radio access networks of a cellular communications system (not illustrated) via a radio access network interface 112. Information over radio access network interface 112 is provided by one or more service providers, also referred herein as carriers and network carriers. RE 104 communicates with one or more wireless user equipment units (not shown) via an air interface 113 which transmits and receives signals over one or more antennas 114, 115, and 116. Examples of a wireless user equipment unit are mobile stations such as a mobile telephone, a wearable device such as a smart watch, a wireless robot, a laptop with mobile termination, an automobile telephone, a fixed wireless device, and the like, which can communicate voice, video, data, programs/program instructions, and the like with a radio access network.

REC 102 communicates with RE 104 via a communications link 110 and a communication bus 111. Link 110 is a point-to-point interface that provides a digital connection between REC 102 and RE 104. Link 110 may be a Common Public Radio Interface (CPRI) link as described in the Common Public Interface Specification, referred herein as the CPRI specification, an Open Base Station Architecture Initiative (OBSAI) interface link as described in the Open Base Station Architecture Initiative BTS System Reference Document, and the like. Link 110 may communicate using Ethernet protocol, High-level Data Link Control (HDLC) protocol, Layer 1 In band (L1 In band) protocol, and the like. Communication bus 111 may be an Ethernet bus, a Peripheral Component Interface (PCI) Express bus, and the like, and may operate outside link 110 utilizing a different communication protocol than link 110. Communication bus 111 can be used to support other communications between the RE, REC, and other devices as needed or desired.

RBS 100 can support a plurality of radio access networks such as an Universal Mobile Telecommunications System (UMTS) network, an evolved UMTS Terrestrial Radio Access (E_UTRA) network, a Worldwide Interoperability for Microwave Access (WiMAX) network, a Global System for Mobile (GSM) network, a Code Division Multiple Access (CDMA) network, a wideband CDMA network, a Time Division Multiple Access (TDMA) network, a Long Term Evolution (LTE) network, a Long Term Evolution Advanced (LTE-A) network, and the like, as appropriate for the application.

REC 102 includes a controller 120, a layer 1 interface 121 connected to link 110, a layer 2 interface 122, a service access point ($SAP_{CM}$) for control and management, a service access point (SAPs) for synchronization, a service access point (IQ) data ($SAP_{IQ}$) for In-Phase and Quadrature, registers 123, a framer 125, a deframer 126, a memory 128, a direct memory access (DMA) 130, a link configurations table 132, system clocks 139 connected to a Phase Lock Loop (PLL) 134, and a delay compensation module 133. PLL 134 is used for frequency control and system clocks 139 provide various clocks to devices of REC 102.

Controller 120 performs a configuration process to implement a link configuration to be utilized by REC 102 and RE 104 during communication over link 110. As will be discussed in greater detail below, the link configuration is based upon requirements provided by one or more service providers. Registers 123 are configured by controller 120 to implement the link configuration. Controller 120 also performs a delay compensation process to implement an initial delay compensation of link 110. Controller 120 may also perform another delay compensation process to implement a new delay compensation of link 110. In response to controller 120 determining that the delay compensation of link 110 is to change, described in further detail below, controller 120 can perform the delay compensation process that changes the delay compensation of link 110. During the delay compensation process, delay compensation information 140 is configured by controller 120 with the new delay compensation information in advance of the change. Delay compensation information 140 corresponds to some or all of registers of delay compensation module 133. Controller 120 can configure registers of delay compensation module 133 from delay compensation information 140 concurrently with that of a controller of RE 104 to implement the new delay compensation concurrently, which will be described in greater detail herein.

Link configurations table 132 includes information identifying various configurations of link 110 that are capable of being supported by REC 102. During an auto-negotiation process as described in the CPRI specification, controller 120 of REC 102 utilizes the information in link configurations table 132 to identify various link configurations that are supported by both REC 102 and RE 104. In particular, link configurations table 132 may include a link total available bit rate of the interface link, a link protocol of the interface link, a seed that is used for scrambling data sent over the link, and the control and management link characteristics having a fast/slow control and management link bit rate of the interface. In an embodiment, scrambling the data is utilized when high link bit rates of the interface are used. In an embodiment, controller 120 configures link configurations table 132 during a configuration process prior to bringing link 110 into operation. For example, according to an embodiment, controller 120 configures link configurations table 132 during a reset, a restart, an initialization, an update process, and the like.

Three different information flows (protocol data planes) are multiplexed over link 110 including data flows of user plane data, control and management plane data, and synchronization plane data. The control plane (control data flow) is used for point-to-point communication processing; the management plane (management data flow) data is management information for the operation, administration and maintenance of link 110, REC 102, and RE 104; the user plane (user data flow) data (IQ data) includes antenna carrier data that has to be transferred from RBS 100 to the user equipment devices, e.g., a mobile phone user, and visa versa, and the synchronization data flow transfers synchronization and timing information between REC 102 and RE 104. In addition to the user plane data, control and management (C&M) control signals as well as synchronization control signals are exchanged between REC 102 and RE 104. All information flows or "planes", including both control and user data, are multiplexed onto link 110 using layer 1 interface 121 and layer 2 interface 122 protocols via the appropriate service access points (SAP-S).

Layer 1 interface 121 is a physical layer interface that performs low level signaling and time division multiplexing of different data flows over link 110, where the data flows correspond to user plane data, control and management plane data, and synchronization plane data, as previously described. Layer 1 interface 121 provides communication interfaces, such as an electrical signal transmitted via an electrical interconnect having electrical characteristics, or an optical signal transmitted via an optical interface having optical characteristics.

Layer 2 interface 122 is a data link layer that provides flexibility and scalability for providing different layer 2 protocols. For example, the data link layer may implement a High-level Data Link Control (HDLC) slow control and management channel, an Ethernet fast control and management channel, and a vendor specific (VSS) control and management channel. Layer 2 interface 122 may further provide media access control, flow control, and data protection of the control and management information flow over link 110 via REC 102. Layer 2 service access points (SAP-S) are defined for the information planes or data flows and are denoted as $SAP_{CM}$, $SAP_S$, and $SAP_{IQ}$ of REC 102. $SAP_{CM}$, $SAP_S$, and $SAP_{IQ}$ are defined on a per link basis, where for a given link, $SAP_{CM}$ is mapped to receive an information flow of control plane data and management plane data for that link, $SAP_S$ is mapped to an information flow of synchronization plane data for that link, and $SAP_{IQ}$ is mapped to an information flow of user plane data based on IQ complex data for that link.

REC 102 can also communicate control, management, and synchronization information to RE 104 via communication bus 111 utilizing protocols of communication bus 111, outside of link 110. Similarly, REC 102 may also receive information from RE 104 via communication bus 111.

REC 102 and RE 104 may communicate user plane data over link 110 as frames of data, where each frame has a basic frame configuration. Each frame contains data of one or more antenna carriers that are mapped within each frame based on mapping information such as stored at a link configuration entry of link configurations table 132. A frame is also referred herein as a basic frame and its frame configuration can be referred herein as a basic frame configuration, and can have the basic frame structure as described in the CPRI specification. In an embodiment, a radio frame is transmitted over link 110 that includes a specified number of hyper frames, where a hyper frame includes a specified number of frames. For example, a radio frame includes 150 hyper frames and each hyper frame includes 256 basic frames as described in the CPRI specification. It will be appreciated that the number of hyper frames included in a radio frame can be any number greater than or equal to zero, the number of frames included in a radio frame can be any number greater than or equal to one, and the number of frames included in a hyper frame can be any number greater than or equal to one. As such, a radio frame can include only frames, or can include a hierarchy of hyper frames and frames.

Registers 123 includes all of the operating registers of REC 102 including link 110 configuration and status registers. Controller 120 configures registers 123 during an auto-negotiation and initializes registers 123 to enable communication between REC 102 and RE 104 and to operate link 110 based on a link configuration entry stored at link configurations table 132.

Registers 123 include transmit/receive antenna carriers control registers; DMA transmit/receive control registers that indicate source and destination addresses; transmit/receive sample width and number of antenna carriers registers; and mapping information that indicates how data associated with the active antenna carriers' data is mapped within a frame, i.e. the link configuration entry that is communicated between REC 102 and RE 104 on link 110. In an embodiment, registers 123 may support a CPRI having CPRI transmit/receive antenna carrier control registers, CPRI DMA transmit/receive control registers, CPRI transmit/receive status registers, CPRI transmit/receive sample width and number of antenna carriers registers, and CPRI frame number registers.

Framer 125 multiplexes the data streams of multiple antenna carriers into frames for transmission over link 110 to RE 104 based on a link configuration of link configurations table 132.

Frames received by REC 102 from RE 104 are provided to a deframer 126, which de-multiplexes the antenna carrier information based upon the link configuration entry of link configurations table 132, as well as other data flow, control and management, and layer 1 interface 121 timing and maintenance information from the frame based on the link configuration entry, and distributes to the appropriate SAP.

DMA 130 can include a plurality of sets of buffers and associated information; each set of buffers of the plurality, and associated information, is associated with a particular antenna carrier and can be allocated by controller 120 during a configuration process. Each sets of buffers include a receive buffer and a transmit buffer that allows the bidirectional transfer of data over link 110 in an efficient manner.

Delay compensation module 133 includes a delay tolerance register 135, a delay compensation buffer 136, and a pulse generator 137 having a count 138. Pulse generator 137 generates a synchronization pulse based on a periodic signal from PLL 134 and count 138. The REC 102 utilizes the synchronization pulse to establish and maintain synchronization of communication between REC 102 and RE 104 over link 110. Delay tolerance register 135 is programmable and can be programmed by REC 102 to a pre-determined margin value, also referred to as a threshold. The synchronization pulse can be, for example, a 10 ms pulse, as described in the CPRI specification. Delay compensation module 133 performs a delay measurement of a round trip delay value, which is the time period measured between the point of time when REC 102 transmits a synchronization transmission of data over link 110 to RE 104 and the point of time when REC 102 receives the synchronization transmission back from RE 104. The round trip delay value can be greatly influenced by the physical length, operating circumstances of link 110, and other accuracy related system parameters, where the operating circumstances of link 110 and the other accuracy related system parameters can vary over time and cause the round trip delay value to change, such as, for example, variations of the temperature of link 110 can cause the round trip delay value to change.

Delay compensation module 133 periodically performs a new delay measurement of the round trip delay value to determine the delay change between the new delay measurement and the delay measurement established for the current configuration of link 110.

Delay compensation buffer 136, also referred herein as a receive elastic buffer, is a dual-clock synchronization first-in first-out (FIFO) buffer that buffers information received at network interface 112 to compensate for delay changes determined from the new delay measurement of link 110. The size of delay compensation buffer 136 can be based on its design and may depend on the length and accompanying delays of the interface link, the range of temperatures of the interface link it is to support, and the fiber type, laser type, wave length used and maximum fiber length targets of the supported interface link. As such, delay compensation buffer 136 has limitations for the delay changes that can be supported, up to a pre-calculated maximum change in delay of delay compensation buffer 136.

During operation, the data received for transmission over link 110, using a recovered receive clock from the received data, is written to a buffer cell of delay compensation buffer 136 pointed to by a write pointer. Framer 125 reads the data from a buffer cell pointed to by a read pointer for further processing using a framer clock. The recovered receive clock and the framer clock are synchronous but are running at different frequencies. An initial distance between the write pointer and the read pointer is maximal, the initial distance being half the size of delay compensation buffer 136. During operation, the distance between the write and read pointer is dynamic and is based on the delay changes of link 110. If the write and read pointers meet, e.g., point to the same buffer cell of delay compensation buffer 136, the data can be lost or corrupted requiring a reconfiguration of link 110 to restore synchronization of link 110. Delay compensation buffer 136 allows REC 102 to compensate for small delay changes automatically, such as, for example, delay changes due to increased temperature of link 110, while maintaining synchronization of link 110 up to a pre-calculated maximum change in delay. For example, when the change in delay of link 110 becomes smaller, such as, for example, when the temperature of link 110 decreases, and more received data is written to delay compensation buffer 136 than is read from delay compensation buffer 136, the additional received data can reside within delay compensation buffer 136, the elastic buffer, until framer 125 reads the received data from the elastic buffer without losing synchronization of the received data. When the change in delay becomes larger, such as, for example, when the temperature of link 110 increases, and less received data is written to delay compensation buffer 136 than is read from delay compensation buffer 136, framer 125 continues to have received data within delay compensation buffer 136, the elastic buffer, to be processed and, as such, framer 125 continues to maintain synchronization and correct functionality of link 110.

When delay compensation module 133 determines that the new delay measurement has violated the value of delay tolerance register 135, where the value of delay tolerance register 135 is less than a value of a pre-calculated maximum change in delay of delay compensation buffer 136, delay compensation module 133 can communicate to controller 120 via an interrupt signal that indicates that the value of delay tolerance register 135 has been violated. In another embodiment, delay compensation module 133 can communicate an indicator that the value of delay tolerance register 135 has been violated to controller 120 via a message. In yet another embodiment, controller 120 may utilize a polling mechanism that reads the indicator from memory mapped locations of delay compensation module 133 that indicates that the value of delay tolerance register 135 has been violated. REC 102 can decide that link 110 is to change to operate based on a new delay compensation which can indicate new delay information, instead of the current delay compensation. The new delay compensation can compensate for the changed round trip delay value and cause the changed round trip delay value to return within the value of delay tolerance register 135.

RE 104 includes a controller 160, a layer 1 interface 161 connected to link 110, a layer 2 interface 162, a $SAP_{CM}$ for control and management, a $SAP_S$ for synchronization, a $SAP_{IQ}$ for In-Phase and Quadrature, registers 163, a framer 165, a deframer 166, a memory 168, a direct memory access (DMA) 170, a link configurations table 172, system clocks 179 connected to a Phase Lock Loop (PLL) 174, and a delay compensation module 173. PLL 174 is used for frequency control and system clocks 179 provide various clocks to devices of RE 104.

Controller 160 performs a configuration process of link 110 that is initiated by REC 102 to determine and implement a link configuration. Registers 163 are configured by controller 160 to implement the link configuration. Controller 160 also performs a delay compensation process to implement the initial delay compensation of link 110 that is initiated by REC 102. In response to controller 160 determining that the delay compensation of link 110 that is initiated by REC 102 is to change, described in further detail below, controller 160 can perform the delay compensation process that changes the delay compensation of link 110. During the delay compensation process, delay compensation information 180 is configured by controller 160 with the new delay compensation information in advance of the change. Delay compensation information 180 corresponds to some or all of registers of delay compensation module 173. Controller 160 can configure registers of delay compensation module 173 from delay compensation information 180 concurrently with that of RE 102 to implement the new delay compensation concurrently, which will be described in greater detail herein.

Link configurations table 172 provides similar functionality as link configurations table 132 and includes information including various link configurations of link 110 that are supported by RE 104. Controller 160 of RE 104 utilizes the information in link configurations table 172 during the auto-negotiation between REC 102 and RE 104 to determine the link configuration of link 110 that both REC 102 and RE 104 support. In an embodiment, controller 160 configures link configurations table 172 during a configuration process prior to bringing link 110 into operation. For example, according to an embodiment, controller 160 configures link configurations table 172 during a reset, a restart, an initialization, an update process, and the like.

Layer 1 interface 161 is a physical layer interface that provides similar functionality as layer 1 interface 121 and performs low level signaling and time division multiplexing of different data flows over link 110, where the data flows correspond to user plane data, control and management plane data, and synchronization plane data, as previously described. Layer 1 interface 161 provides communication interfaces, such as an electrical signal transmitted via an electrical interconnect having electrical characteristics, or an optical signal transmitted via an optical interface having optical characteristics.

Layer 2 interface 162 provides similar functionality as layer 2 interface 122 and provides RE 104 access to the different information flows via service access points $SAP_{CM}$, $SAP_S$, and $SAP_{IQ}$ of RE 104 which correspond to service access points $SAP_{CM}$, $SAP_S$, and $SAP_{IQ}$ of REC 102.

$SAP_{CM}$, $SAP_S$, and $SAP_{IQ}$ of RE 104 provide similar functionality as $SAP_{CM}$, $SAP_S$, and $SAP_{IQ}$ of REC 102 and are each associated with $SAP_{CM}$, $SAP_S$, and $SAP_{IQ}$ of REC 102, respectively.

RE 104 can also receive control, management, and synchronization information from REC 102 via communication bus 111 utilizing protocols of communication bus 111. Similarly, RE 104 may also provide information to REC 102 via communication bus 111. Communication bus 111 may allow REC 102 and REC 104 to communicate information in a more efficient manner than communication over link 110 and may allow the use of other protocols outside of link 110.

Registers 163 provide similar functionality as registers 123 and include operating registers of RE 104 including the link 110 configuration and status registers. Controller 160 configures registers 163 during an auto-negotiation to initialize registers 163 to enable communication between REC 102 and RE 104 over link 110 based on a link configuration of link 110 agreed upon with REC 102.

Framer 165 provides similar functionality as framer 125 and multiplexes the data received from radio 174, control and management information, synchronization information, and layer 1 interface 161 information into particular frames based on a link configuration entry of link configurations table 132. Frames received by RE 104 from REC 102 are provided to a deframer 166, which de-multiplexes the antenna carrier information based upon the link configuration entry of link configurations table 132, as well as other data flow, control and management, and layer 1 interface 121 timing and maintenance information from the frame based on the link configuration entry, and distributes to the appropriate SAP.

DMA 170 provides similar functionality as DMA 130 and can include a plurality of sets of buffers and associated information; each set of buffers of the plurality, and associated information, is associated with a particular antenna carrier and can be allocated by controller 120 during a configuration process. Each sets of buffers include a receive buffer and a transmit buffer that allows the bidirectional transfer of data over link 110 in an efficient manner.

Delay compensation module 173 includes a pulse generator 177 having a count 174. Pulse generator 177 generates a synchronization pulse based on PLL 174, count 178, and a recovered clock from a frame received from REC 102 that RE 104 utilizes to maintain synchronization of communication between REC 102 and RE 104 over link 110.

Figure 2:
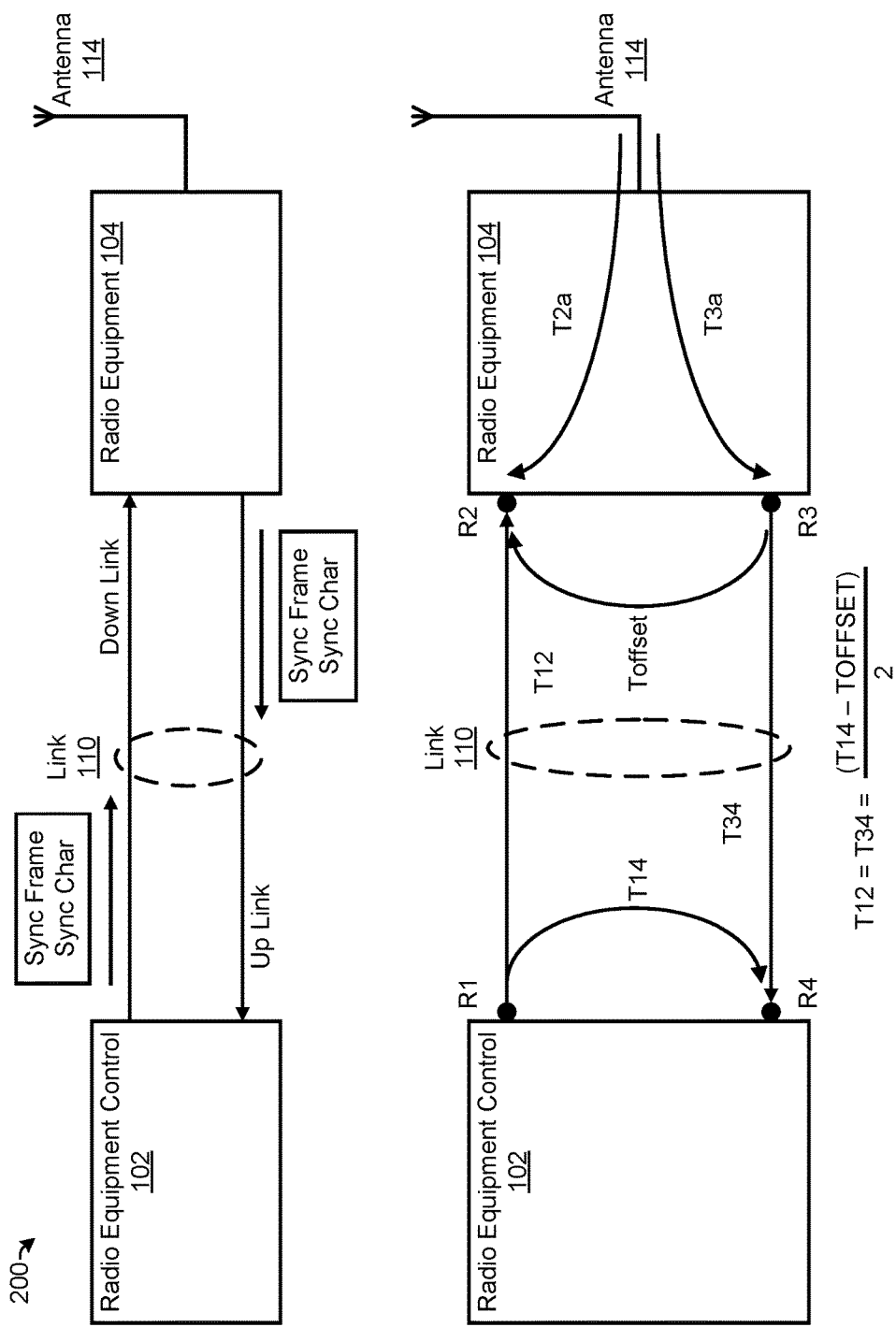
FIG. 2 is a block diagram illustrating time delays of communication of the radio equipment control device of FIG. 1, in accordance with at least one embodiment of the present disclosure.

FIG. 2 is a block diagram 200 illustrating exemplary time delays while performing a delay measurement of link 110 during operation of RBS 100 of FIG. 1. As shown, as part of performing a delay measurement of a round trip delay value for delay compensation, REC 102 transmits a synchronization frame having a synchronization character that is aligned with a synchronization pulse from output point R1 of REC 102, such as, for example, a synchronization pulse having a 10 ms period of REC, a synchronization frame at the beginning of a hyper frame aligned with a 10 ms synchronization pulse of REC 102 that includes a K28.5 synchronization character, over the down link of link 110 to input point R2 of RE 104, as described in the CPRI specification. When RE 104 receives the synchronization frame, RE 104 recovers the synchronization pulse from the synchronization frame and transmits the synchronization frame from output point R3 of RE 104 over the up link of link 110 back to input point R4 of REC 102 where it is received. The measured time delays of the round trip delay are represented by a delay T12 for the transmission from REC 102 to RE 104, a delay Toffset between the reception and transmission of the synchronization frame by RE 104, and a delay of T34 for the transmission from RE 104 to REC 102. The measure round trip delay is represented by T14 and the other measured delays are given by the equations T12=T34=(T14−Toffset)/2, where REC 102 knows the value of Toffset of RE 104 in advance of the delay measurement, such as, for example, Toffset can be a pre-defined value or RE 104 informs REC 104 of the value of Toffset. Time delays T2a and T3a represent the time for RE 104 to receive and transmit data via antenna 114 and are not included in the delay measurement. The delay measurement allows REC 102 to perform delay compensation, maintain the relationship between the synchronization pulse of REC 102 and the recovered synchronization pulse at RE 104, and maintain synchronization of link 110.

Figure 3:
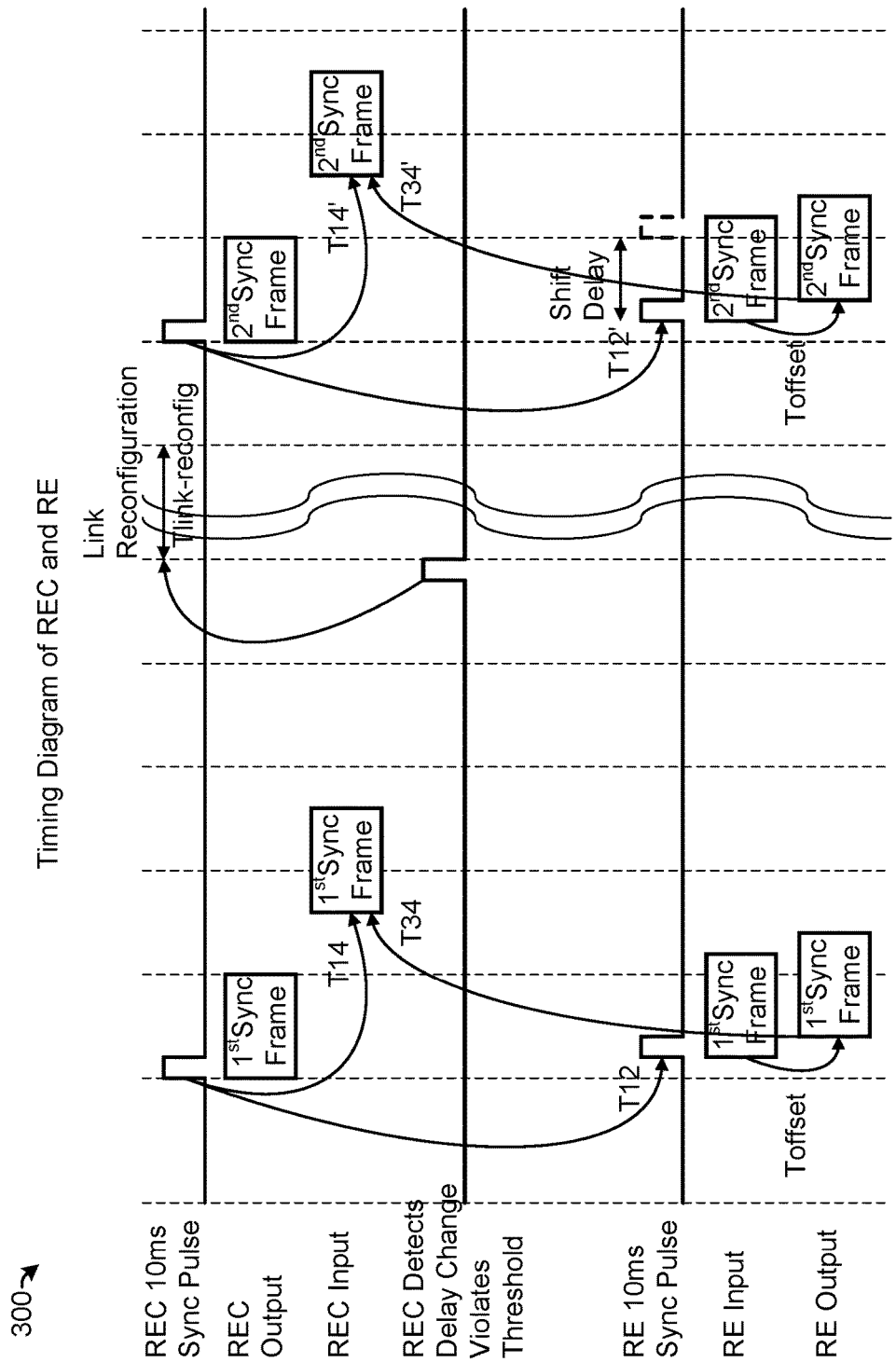
FIG. 3 is a timing diagram of REC and RE handling delay compensation of an interface link in operation due to lost synchronization of the interface link.

FIG. 3 illustrates a prior art timing diagram 300 of REC 102 and RE 104 performing delay compensation of interface link 110 that exceeded the capability of compensation buffer 136 to compensate for delay changes of link 110 during operation of link 110. REC 102 performs a first delay measurement by transmitting a first synchronization frame aligned to a first synchronization pulse, such as, for example, a first pulse having a 10 ms period, from the output of REC 102 over link 110 to RE 104. After a delay of T12, RE 104 receives the first synchronization frame at an input of RE 104 and recovers the first synchronization pulse from the first synchronization frame. After a delay of Toffset, RE 104 transmits the first synchronization pulse aligned to the recovered first synchronization pulse from the output of RE 104 back to REC 102. After a delay of T34, REC 102 receives the first synchronization pulse at the input of REC 102. The first delay measurement allows REC 102 to compensate for a first delay and for data transmission between REC 102 and RE 104 to be synchronized, e.g., data framed by a framer and transmitted by one side of link 110, e.g. by framer 125 and REC 102, is received and correctly deframed by the other side of link 110, e.g. deframer 166 and RE 104.

During further operation of link 110, REC 102 periodically measures a further delay change of link 110 and can detect that the further delay change violates a pre-defined margin/threshold value which indicates that the further delay change exceeds the capability of compensation buffer 136 to compensate for the further delay change caused by, for example, an increase in the temperature of link 110. When this happens, REC 102 is unable to maintain the relationship between the synchronization pulse of REC 102 and the recovered synchronization pulse at RE 104. As such, data transmissions received over link 110 are subject to no longer being correctly deframed by the receiving side of link 110.

Therefore, in response to REC 102 detecting that the further delay change violates the pre-defined margin/threshold value, REC 102 performs a reconfiguration of link 110 to re-establish synchronization at a shifted synchronization pulse and updated delays T12', T14', and T34' that compensates for the further delay change of link 110. The time to complete the reconfiguration of link 110 is represented by Tlink-reconfig which may be a large amount of time, where link 110 is not operational during the reconfiguration process, resulting in loss of data and lower quality of service. REC 102 performs a second delay measurement by transmitting a second synchronization frame aligned to a second synchronization pulse, such as, for example, a second pulse having the 10 ms period, from the output of REC 102 over link 110 to RE 104. After a delay of T12', RE 104 receives the second synchronization frame at the input of RE 104 and recovers the second synchronization pulse from the second synchronization frame. The earlier synchronization pulse is shown in the timing diagram as a "dotted" line pulse and represents where the first synchronization pulse would have been at the input of RE 104 had the reconfiguration process not occurred. The second synchronization pulse is shifted from the first synchronization pulse by a shift delay value. After a delay of Toffset, RE 104 transmits the second synchronization pulse aligned to the recovered first synchronization pulse from the output of RE 104 back to REC 102. After a delay of T34', REC 102 receives the second synchronization pulse at the input of REC 102.

Figure 4:
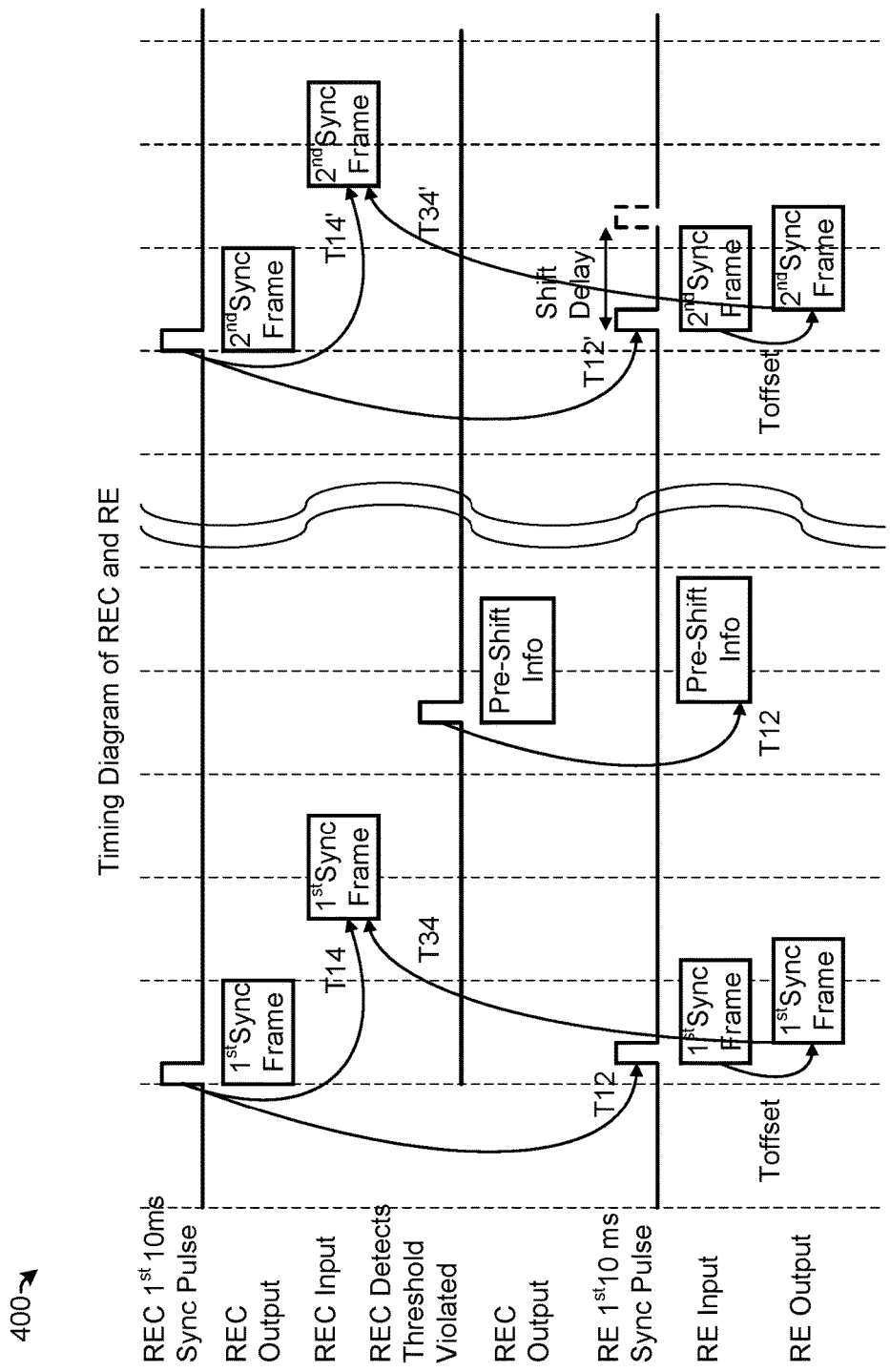
FIG. 4 is a timing diagram of REC and RE automatic delay compensation of an interface link in operation, in accordance with at least one embodiment of the present disclosure.

FIG. 4 illustrates an exemplary timing diagram 400 of REC 102 and RE 104 performing automatic delay compensation of link 110 in operation. REC 102 performs a first delay measurement by transmitting a first synchronization frame aligned to a first synchronization pulse, such as, for example, a first 10 ms pulse, from the output of REC 102 over link 110 to RE 104. After a delay of T12, RE 104 receives the first synchronization frame at an input of RE 104 and recovers the first synchronization pulse from the first synchronization frame. After a delay of Toffset, RE 104 transmits the first synchronization pulse aligned to the recovered first synchronization pulse from the output of RE 104 back to REC 102. After a delay of T34, REC 102 receives the first synchronization pulse at the input of REC 102. The first delay measurement allows REC 102 to compensate for a first delay and for data transmission between REC 102 and RE 104 to be synchronized, i.e. data framed by a framer and transmitted by one side of link 110 is received and correctly deframed by the other side of link 110.

During further operation of link 110, REC 102 detects that the delay change value has violated the value of delay tolerance register 135, and in response, REC 102 can decide that link 110 is to change to operate based on a second delay compensation which can indicate second delay compensation information stored at delay compensation information 140. The second delay compensation can compensate for the changed round trip delay value and cause the changed round trip delay value to return within the value of delay tolerance register 135 by shifting the first synchronization pulse. The second delay compensation information is provided to RE 104 from REC 102 in advance of the change so that RE 104 can prepare to receive frames based on the second delay compensation. REC 102 transmits the second delay compensation information from the output of REC 102 over link 110 to RE 104. After the delay of T12, RE 104 receives the second delay compensation information at the input of RE 104 and stores it at delay compensation information 180. As such, RE 104 and REC 102 continue to communicate frames based on the first delay compensation while preparing for the second delay compensation. An indicator is also provided to RE 104 by REC 102 that indicates when the change is to occur. According to an embodiment, the indicator as to when link 110 is to change operation is a specific radio frame number and REC 102 determines that operation of link 110 is to change now by determining that the radio frame having the specific radio frame number is to be transmitted over link 110 to RE 104. Similarly, RE 104 determines that operation of link 110 is to change now by determining that the radio frame having the specific radio frame number has been received over link 110 from REC 102. Controller 120 updates registers 123 with delay compensation information 140 in the last radio frame that immediately precedes the frame having the specific radio frame number before the change is to occur (i.e. the radio frame boundary of the change of link operation). Similarly, controller 160 updates registers 163 with delay compensation information 180 in the last radio frame that immediately precedes the frame having the specific radio frame number before the change is to occur, as described above.

After the change of operation of link 110 has occurred, REC 102 transmits a second synchronization frame aligned to a second synchronization pulse, such as, for example, a second pulse having a 10 ms period, from the output of REC 102 over link 110 to RE 104. After a delay of T12', RE 104 receives the second synchronization frame at the input of RE 104 and recovers the second synchronization pulse from the second synchronization frame. The first synchronization pulse is shown in the timing diagram as a "dotted" line pulse and represents where the first synchronization pulse would have been at the input of RE 104 had the first synchronization pulse not have been shifted by a shift delay value to automatically compensate for the updated delays T12', T14', and T34'. After a delay of Toffset, RE 104 transmits the second synchronization pulse aligned to the recovered first synchronization pulse from the output of RE 104 back to REC 102. After a delay of T34', REC 102 receives the second synchronization pulse at the input of REC 102. REC 102 continues operation of link 110 based on the updated second delay compensation, now the current delay compensation. Similarly, RE 104 continues operation of link 110 based on the updated second delay compensation of link 110.

By delay compensation module 133 of REC 102 periodically performing delay measurements of the round trip delay value and determining when a new delay measurement has violated a value of delay tolerance register 135, REC 102 automatically compensates for large delay changes during operation of link 110 while maintaining synchronization of link 110 between REC 102 and RE 104. Thus, quality of service is improved, data is not lost, meaningful down time of link 110 is avoided, synchronization of link 110 can be independent of the physical length and accompanying delays of link 110, and the influence of delay compensation is minimized. Reconfiguration of link 110 based on new delay information without the typical auto-negotiation process that initially establishes link 110 avoids dropping of data. In this manner, performing automatic delay compensation of interface links allows communication to be continuous without any disruptions as operating conditions warrant. For example, all data of a service provider's communication is transmitted, as opposed to some data being discarded.

Figure 5:
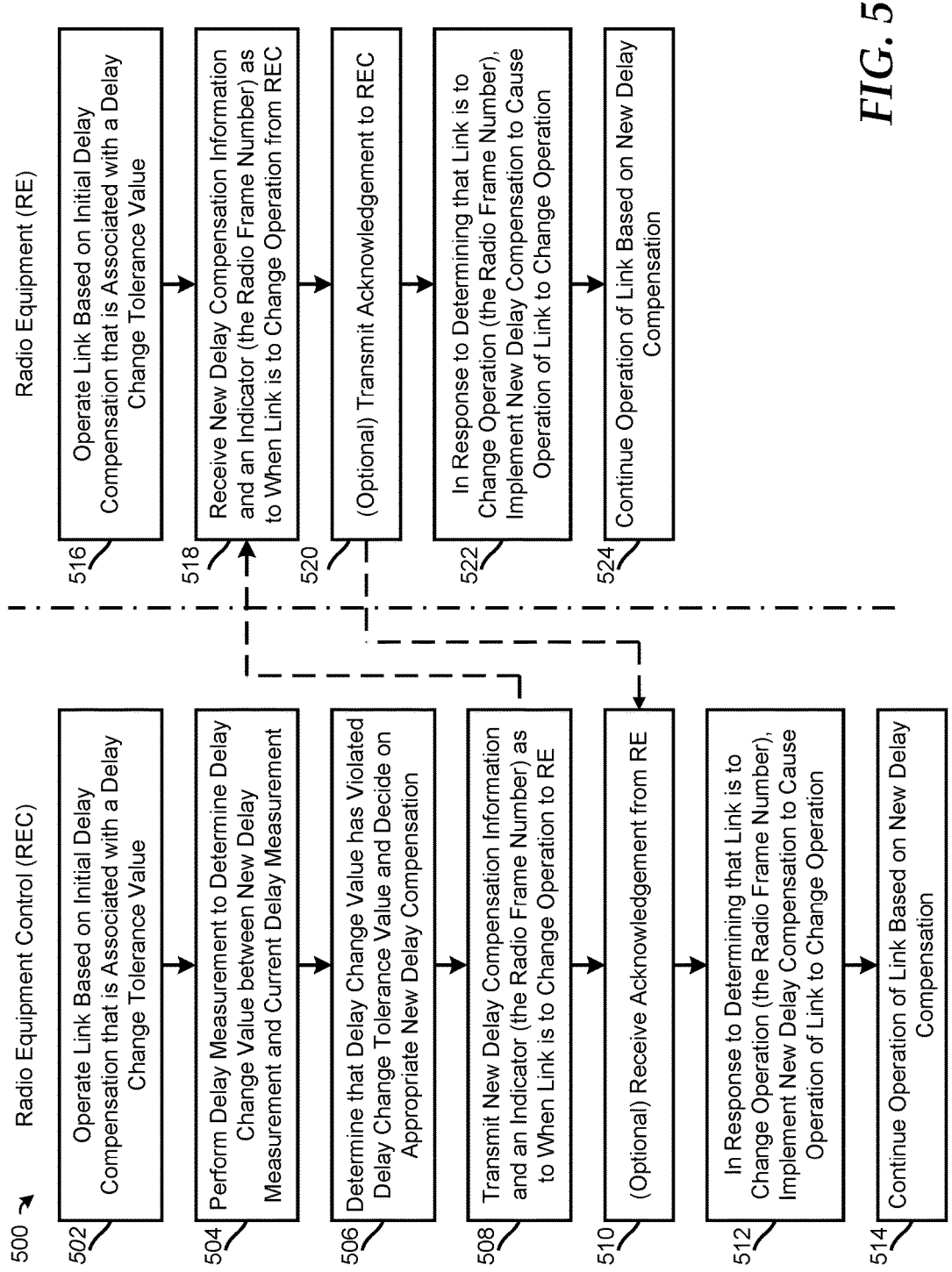
FIG. 5 illustrates a method for performing automatic delay compensation of an interface link in operation of the radio base station system of FIG. 1, in accordance with at least one embodiment of the present disclosure.

FIG. 5 illustrates a method 500 for performing automatic delay compensation of an interface link in operation of the radio base station system of FIG. 1, where the exemplary method 500 begins at block 502 for the REC and block 514 for the RE as described below. Prior to blocks 502 and 514, a delay compensation process has occurred between REC 102 and RE 104 that established an initial delay compensation of link 110 that is utilized to maintain synchronization of link 110, as described previously.

At block 502, REC 102 of RBS 100 operates link 110 between REC 102 and RE 104 based on the initial delay compensation of link 110 and is associated with a value of delay tolerance register 135. At block 504, delay compensation module 133 of REC 102 performs a new delay measurement of the round trip delay value to determine the change between the new delay measurement and the initial delay measurement.

At block 506, delay compensation module 133 determines that the new delay measurement has violated the value of delay tolerance register 135 and communicates to controller 120 that the value of delay tolerance register 135 has been violated. In response, controller 120 decides that link 110 is to change to operate based on a new delay compensation, instead of the initial delay compensation. The new delay compensation can compensate for the changed round trip delay value and cause the changed round trip delay value to return within the value of delay tolerance register 135.

At block 508, controller 120 of REC 102 transmits the desired new delay compensation information and an indicator as to when link 110 is to change operation to RE 104, such as, for example, a radio frame having a specific radio frame number to be received over link 110 that indicates when to change operation, as indicated by the dashed arrow between block 508 and block 518. Controller 120 of REC 102 configures delay compensation information 140 based on the desired upcoming new delay compensation. In an embodiment, method 500 proceeds to block 510. In another embodiment, method 500 proceeds directly to block 512.

At block 510, controller 120 of REC 102 receives an acknowledgement from RE 104 that indicates RE 104 received the desired new delay compensation information and the indicator as to when link 110 is to change operation, as indicated by the dashed arrow between block 520 and block 510.

At block 512, in response to REC 102 determining that the indicator as to when link 110 is to change operation indicates that operation is to change now, such as, for example, that the radio frame having the specific radio frame number is to be transmitted over link 110 to RE 104, controller 120 updates registers of delay compensation module with values at delay compensation information 140 to implement the new delay compensation and cause the operation of link 110 to change operation. At block 514, REC 102 continues operation of link 110 based on the desired new delay compensation.

At block 516, in parallel to method 500 proceeding at block 502 as described above, RE 104 operates link 110 based on the initial delay compensation of link 110. At block 518, controller 160 of RE 104 receives the desired new delay compensation information and the indicator as to when link 110 is to change operation from REC 102. Controller 160 configures delay compensation information 180 based on the upcoming new delay compensation information. In an embodiment, method 500 proceeds to block 520. In another embodiment, method 500 proceeds directly to block 522.

At block 520, controller 160 of RE 104 transmits an acknowledgement to REC 102 that indicates RE 104 received the desired new delay compensation information and the indicator as to when link 110 is to change operation, as indicated by the dashed arrow between block 520 and block 510.

At block 522, in response to RE 104 determining that the indicator as to when link 110 is to change operation indicates that operation is to change now, such as, for example, that the radio frame having the specific radio frame number has been received over link 110 from REC 102, controller 160 updates registers 163 with values at delay compensation information 180 to implement the new delay compensation and cause the operation of link 110 to change operation. At block 524, RE 104 continues operation of link 110 based on the desired new delay compensation information. As such, method 500 for performing automatic delay compensation of an interface link in operation of RBS 100 has successfully completed.

The following describes the auto-negotiation process between REC 102 and RE 104 in further detail. REC 102 performs the auto-negotiation between REC 102 and RE 104 to determine the link configuration of link 110 that is supported by both REC 102 and RE 104 in the following manner. Since link 110 may have been set up when the link configurations of REC 102 operate and the link configurations of RE 104 operate, are not initially known to each other, REC 102 and RE 104 must try different link configurations until a common link configuration is determined. Thus, REC 102 performs the auto-negotiation between REC 102 and RE 104 to determine the link configuration of link 110 that is supported by both REC 102 and RE 104. The following description is based on the CPRI nomenclature, but is not limited to just CPRI interfaces, but instead, may be employed in RBSs utilizing any interfaces between a REC and a RE.

The auto-negotiation process starts by determining the link bit rate of link 110 and reaching layer 1 synchronization between REC 102 and RE 104. REC 102 starts to transmit over link 110 to RE 104 using, for example, the highest available link bit rate from link configurations table 129 of REC 102 and also attempts to receive over link 110 from RE 104 at the same link bit rate. If REC 102 does not reach layer 1 synchronization, (i.e., REC 102 does not receive the proper information and at the proper repetition rate), REC 102 selects, after an appropriate time delay, another available link bit rate from link configurations table 129 of REC 102, for example the next highest available link bit rate, and REC 102 starts to transmit/receive over link 110 to/from RE 104 using the other available link bit rate. This process proceeds until REC 102 reaches layer 1 synchronization with RE 104.

On the other side of link 110, RE 104 starts to receive over link 110 from REC 102 using, for example, the highest available link bit rate from link configurations table 169 of RE 104. If RE 104 does not reach layer 1 synchronization, (i.e., RE 104 does not receive the proper information and at the proper repetition rate), RE 104 selects, after a second appropriate time delay which may be different than the time delay utilized by REC 102, another available link bit rate from link configurations table 169 of RE 104, for example the next highest available link bit rate, and starts to receive over link 110 from REC 102 using the other available link bit rate. This process proceeds until RE 104 reaches layer 1 synchronization with REC 102. When RE 104 reaches synchronization of layer 1, RE 104 starts to transmit over link 110 to REC 102 at the same link bit rate that RE 104 successfully received at. At this point, synchronization of layer 1 of link 110 between REC 102 and RE 104 has been achieved with bi-directional communication.

In response to successfully determining the link bit rate that REC 102 and RE 104 support and achieving synchronization of layer 1 of link 110, the auto-negotiation process proceeds by determining the link protocol of link 110 that both REC 102 and RE 104 support. Similar to determining the link bit rate of link 110, REC 102 and RE 104 each propose, for example, the highest link protocol of its link configurations table 129 and 169, respectively. REC 102 and RE 104 then compare the other's proposed highest link protocol with all the link protocols of its link configurations table 129 and 169 to determine a match. If a match is not determined, REC 102 and RE 104 propose, for example, the next highest link protocol of its link configurations table 129 and 169 and determine if there is a matching link protocol as described above. This auto-negotiation process proceeds until REC 102 and RE 104 determines the same link protocol that both support and the auto-negotiation proceeds using the same link protocol.

In response to successfully determining the same link protocol, the auto-negotiation process proceeds to determine a layer 2 fast control and management link bit rate of link 110 for communication that utilizes Ethernet protocol and a layer 2 slow control and management link bit rate of link 110 for communication that utilizes HDLC protocol that both REC 102 and RE 104 support. The auto-negotiation process to determine the fast and the slow control and management link bit rate proceeds in parallel, with each fast/slow control management link bit rate determined similar to how the auto-negotiation process determined the link bit rate of link 110 as described above. As such, REC 102 and RE 104 determines the fast/slow control and management link bit rate of link 110 by successively trying an available fast/slow control and management link bit rate of each link configurations table 129 of REC 102 and 169 of RE 104 until the same fast/slow control and management link bit rate of link 110 that both REC 102 and RE 104 support is determined.

In response to successfully determining the same fast/slow control and management link bit rate, the auto-negotiation process proceeds to determine a vendor-specific interface usage that both REC 102 and RE 104 support. The auto-negotiation to determine the same vendor-specific interface usage, for example vendor-specific interface capabilities and capability limitations, can be accomplished in a similar manner as described above for the other link configuration characteristics and results in the same (preferred) vendor-specific interface usage based on vendor-specific requirements. At this point, the auto-negotiation has completed and determined the link configuration of link 110 that is supported by both REC 102 and RE 104 and the link configuration registers 123 include the values of the link configuration of link 110.

It will be appreciated that the devices disclosed herein can be implemented in various manners using various types of memory.

Controller 120, layer 1 interface 121, layer 2 interface 122, SAP$_{CM}$, SAP$_S$, SAP$_{IQ}$, registers 123, framer 125, deframer 126, memory 128, DMA 130, link configurations table 132, delay compensation module 133, link 110, communication bus 111, and network interface 112 can communicate with each other via interconnects (not illustrated).

Controller 160, layer 1 interface 161, layer 2 interface 162, SAPCM, SAPS, SAPIQ, registers 163, shadow registers 164, framer 165, deframer 166, memory 168, DMA 170, link configurations table 172, radio 174, link 110, communication bus 111, and air interface 113 can communicate with each other via interconnects (not illustrated).

The interconnects disclosed herein are used to communicate information between various modules and devices either directly or indirectly. For example, each of the interconnects can be implemented as a passive device, such as conductive nodes that include one or more conductive traces, that transmits directly between the various modules and devices, or as an active device, where information being transmitted is buffered, for example stored and retrieved, in the process of being communicated between devices, such as at a first-in first-out memory or other memory device. In addition, a label associated with an interconnect can be used herein to refer to a signal and information transmitted by the interconnect.

REC 102, RE 104, controllers 120 and 160, layer 1 interfaces 121 and 161, layer 2 interfaces 122 and 162, framers 125 and 165, deframers 126 and 166, memories 128 and 168, DMAs 130 and 170, radio 167, delay compensation modules 133 and 173, network interface 112, and air interface 113 can be provided by, for example, an instruction based Digital Signal Processor (DSP), an Application Specific Integrated Circuit (ASIC) device, a Field Programmable Gate Array (FPGA), a General Purpose Processor (GPP), another type of logic circuit capable of performing operations, the like, and combinations thereof. In an exemplary embodiment, REC 102 represents a digital baseband signal processor and RE 104 represents a digital signal processor.

According to one aspect, a method is disclosed in accordance with at least one embodiment of the present disclosure. The method includes performing, at a radio equipment control (REC) device of a radio base station, a delay measurement of a first round trip delay value of an interface link, the first round trip delay value based on a first transmission of a first REC synchronization signal over the interface link to a radio equipment (RE) device and when the REC device receives a first RE synchronization signal back over the interface link, where frames transmitted over the interface link by the REC device are synchronized based upon the first REC synchronization signal that is maintained by the REC device and frames transmitted over the interface link by the RE device are synchronized based upon the first RE synchronization signal that is maintained by the RE device. The method also includes calculating a first delay change value between the first round trip delay value and a previous round trip delay value of the interface link. The method further includes in response to determining that the first delay change value has violated a delay tolerance value, transmitting an offset indicator from the REC over the interface link that indicates an amount of offset the RE device is to shift the first RE synchronization signal at a future time. The method also includes after the future time, transmitting frames from the REC device over the interface link after shifting the first REC synchronization signal.

In an embodiment, the method also includes compensating for delay changes by utilizing a delay compensation buffer by the REC device. In an embodiment, the delay tolerance value is programmable. In an embodiment, performing the delay measurement is based on a delay measurement time period that is programmable. In an embodiment, the delay tolerance value is based on a physical length of the interface link and other accuracy related system parameters. In an embodiment, the first delay change value is due to a change in temperature of the interface link. In an embodiment, the amount of offset the RE device is to shift the first RE synchronization signal is relative to the first REC synchronization signal. In an embodiment, the interface link includes one or more of a common public radio interface (CPRI) and an open base station architecture initiative (OBSAI) interface.

According to another aspect, a radio equipment control system is disclosed in accordance with at least one embodiment of the present disclosure. The radio equipment control system includes a Radio Equipment Control (REC) device configured to maintain synchronization of transmissions over an interface link to a Radio Equipment (RE) device, the REC device having a device controller, a delay compensation module, a REC synchronization signal generator, and a delay tolerance register. The delay compensation module to perform a delay measurement of a first round trip delay value of the interface link, the first round trip delay value based on a first transmission of a first REC synchronization signal over the interface link to a radio equipment (RE) device and when the REC device receives a first RE synchronization signal back over the interface link, the first REC synchronization signal generated by the REC synchronization signal generator, where frames transmitted over the interface link by the REC device are synchronized based upon the first REC synchronization signal that is maintained by the REC device, and frames transmitted over the interface link by the RE device are synchronized based upon the first RE synchronization signal that is maintained by the RE device. The delay compensation module to calculate a first delay change value between the first round trip delay value and a previous round trip delay value of the interface link. In response to the first delay change value violating a delay tolerance value of the delay tolerance register, the device controller configured to transmit an offset indicator over the interface link that indicates an amount of offset the RE device is to shift the first RE synchronization signal at a future time. After the future time, the device controller configured to transmit frames from the REC device over the interface link after shifting the first REC synchronization signal.

In an embodiment, the radio equipment control system further configured to compensate for delay changes that do not violate the delay tolerance value by utilizing a delay compensation buffer of the REC device. In an embodiment, the delay tolerance value of the delay change tolerance register is stored at a programmable location. In an embodiment, the perform the delay measurement is based on a delay measurement time period that is programmable. In an embodiment, the delay tolerance value is based on a physical length of the interface link and other accuracy related system parameters. In an embodiment, the first delay change value is due to a change in temperature of the interface link. In an embodiment, the device controller is configured to determine the amount of offset relative to the first REC synchronization signal. In an embodiment, the REC device is one of a Field Programmable Gate Array (FPGA), a Digital Signal Processor (DSP), an Application Specific Integrated Circuit (ASIC) device, and a General Purpose Processor (GPP). In an embodiment, the REC is to implement interface link as one or more of a common public radio interface (CPRI) and an open base station architecture initiative (OBSAI) interface.

According to another aspect, a method is disclosed in accordance with at least one embodiment of the present disclosure. The method includes receiving a first Radio Equipment Control (REC) synchronization signal over an interface link by a Radio Equipment (RE) device from a transmission by a REC device. The method also includes transmitting a first RE synchronization signal back over the interface link for reception by the REC device, where frames received over the interface link by the RE device from transmissions by the REC device are synchronized based upon the first REC synchronization signal that is maintained by the REC device, and frames transmitted over the interface link by the RE device are synchronized based upon the first RE synchronization signal that is maintained by the RE device. The method further includes receiving an offset indicator over the interface link that indicates an amount of offset the RE device is to shift the first RE synchronization signal at a future time. The method also includes after the future time, transmitting frames from the RE device over the interface link after shifting the first RE synchronization signal.

In an embodiment, the amount of offset the RE device is to shift the first RE synchronization signal is based on a delay measurement of a first round trip delay value of the interface link and a first delay change value having violated a delay tolerance value. In an embodiment, the amount of offset the RE device is to shift the first RE synchronization signal is relative to the first REC synchronization signal.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
performing, at a radio equipment control (REC) device of a radio base station, a delay measurement of a first round trip delay value of an interface link at a first time, the first round trip delay value based on a first transmission of a REC synchronization signal over the interface link to a radio equipment (RE) device and when the REC device receives a RE synchronization signal back over the interface link, wherein frames transmitted over the interface link by the REC device are synchronized based upon the REC synchronization signal that is maintained by the REC device, and frames transmitted over the interface link by the RE device are synchronized based upon the RE synchronization signal that is maintained by the RE device;
detecting a second round trip delay value of the interface link at a second time, wherein the second time is after the first time;
calculating a delay change value between the first round trip delay value and the second round trip delay value;
in response to determining that the delay change value has violated a delay tolerance value, transmitting an offset indicator from the REC over the interface link that indicates an amount of offset the RE device is to shift the RE synchronization signal at a particular future radio frame number; and
after the particular future radio frame number, transmitting frames from the RE device over the interface link based upon the shifted RE synchronization signal.

2. The method of claim 1, further comprising:
compensating for delay changes by utilizing a delay compensation buffer by the REC device.

3. The method of claim 1, wherein the delay tolerance value is programmable.

4. The method of claim 1, wherein performing the delay measurement is based on a delay measurement time period that is programmable.

5. The method of claim 1, wherein the delay tolerance value is based on a physical length of the interface link and other accuracy related system parameters.

6. The method of claim 1, wherein the delay change value is due to a change in temperature of the interface link.

7. The method of claim 1, wherein the amount of offset the RE device is to shift the RE synchronization signal is relative to the REC synchronization signal.

8. The method of claim 1, wherein the interface link comprises one or more of a common public radio interface (CPRI) and an open base station architecture initiative (OBSAI) interface.

9. A radio equipment control system comprising:
a Radio Equipment Control (REC) configured to maintain synchronization of transmissions over an interface link to a Radio Equipment (RE), the REC having a device controller, a delay compensation circuit, a REC synchronization signal generator, and a delay tolerance register;
the delay compensation circuit to perform a delay measurement of a first round trip delay value of the interface link at a first time, the first round trip delay value based on a first transmission of a REC synchronization signal over the interface link to a radio equipment (RE) and when the REC receives a RE synchronization signal back over the interface link, the REC synchronization signal generated by the REC synchronization signal generator, wherein frames transmitted over the interface link by the REC are synchronized based upon the first REC synchronization signal that is maintained by the REC, and frames transmitted over the interface link by the RE are synchronized based upon the RE synchronization signal that is maintained by the RE;
the delay compensation circuit to detect a second round trip delay value of the interface link at a second time, wherein the second time is after the first time
the delay compensation circuit to calculate a delay change value between the first round trip delay value and the second round trip delay value;
in response to the delay change value violating a delay tolerance value of the delay tolerance register, the device controller configured to transmit an offset indicator over the interface link that indicates an amount of offset the RE is to shift the RE synchronization signal at a particular future radio frame number; and
after the particular future radio frame number, the device controller configured to transmit frames from the RE over the interface link based upon the shifted RE synchronization signal.

10. The radio equipment control system of claim 9, further configured to compensate for delay changes that do not violate the delay tolerance value by utilizing a delay compensation buffer of the REC.

11. The radio equipment control system of claim 9, wherein the delay tolerance value of the delay change tolerance register is stored at a programmable location.

12. The radio equipment control system of claim 9, wherein the delay measurement is based on a delay measurement time period that is programmable.

13. The radio equipment control system of claim 9, wherein the delay tolerance value is based on a physical length of the interface link and other accuracy related system parameters.

14. The radio equipment control system of claim 9, wherein the delay change value is due to a change in temperature of the interface link.

15. The radio equipment control system of claim 9, wherein the device controller is configured to determine the amount of offset relative to the REC synchronization signal.

16. The radio equipment control system of claim 9, wherein the REC is one of a Field Programmable Gate Array (FPGA), a Digital Signal Processor (DSP), an Application Specific Integrated Circuit (ASIC) device, and a General Purpose Processor (GPP).

17. The radio equipment control system of claim 9, wherein the REC is to implement interface link as one or more of a common public radio interface (CPRI) and an open base station architecture initiative (OBSAI) interface.

18. A method comprising:
receiving a Radio Equipment Control (REC) synchronization signal over an interface link by a Radio Equipment (RE) device from a transmission by a REC device;
transmitting a RE synchronization signal back over the interface link for reception by the REC device, wherein frames received over the interface link by the RE device from transmissions by the REC device are synchronized based upon the REC synchronization signal that is maintained by the REC device, and frames transmitted over the interface link by the RE device are synchronized based upon the RE synchronization signal that is maintained by the RE device;

performing a delay measurement of a first round trip delay value of the interface link at a first time in response to receiving the REC synchronization signal and to transmitting the RE synchronization signal;

detecting a second round trip delay value of the interface link at a second time, wherein the second time is after the first time;

calculating a delay change value between a first round trip delay value of the interface link at a first time and a second round trip delay value of the interface link at a second time, wherein the second time is after the first time;

in response to determining that the delay change value has violated a delay tolerance value, receiving an offset indicator over the interface link that indicates an amount of offset the RE device is to shift the RE synchronization signal at a particular future radio frame number; and after the particular future radio frame number, transmitting frames from the RE device over the interface link based upon the shifted RE synchronization signal.

19. The method of claim 18, wherein the amount of offset the RE device is to shift the RE synchronization signal is based on a delay measurement of a first round trip delay value of the interface link and a delay change value having violated a delay tolerance value.

20. The method of claim 18, wherein the amount of offset the RE device is to shift the RE synchronization signal is relative to the REC synchronization signal.

* * * * *